United States Patent [19]

Arikawa et al.

[11] 4,453,782
[45] Jun. 12, 1984

[54] BRAKE FLUID PRESSURE CONTROL APPARATUS IN SKID CONTROL SYSTEM

[75] Inventors: Tetsuro Arikawa; Yasuo Samatsu, both of Kanagawa, Japan

[73] Assignee: Nippon Air Brake Co., Ltd., Kobe, Japan

[21] Appl. No.: 324,797

[22] Filed: Nov. 25, 1981

[30] Foreign Application Priority Data

Nov. 29, 1980 [JP] Japan .............................. 55-168954
Dec. 8, 1980 [JP] Japan .............................. 55-172889

[51] Int. Cl.³ .............................................. B60T 8/02
[52] U.S. Cl. ...................................... 303/116; 303/68; 303/119
[58] Field of Search ............... 303/116, 119, 113, 115, 303/117, 114, 61-63, 68-69, 10-12, 6 C, 91-92; 188/181

[56] References Cited

U.S. PATENT DOCUMENTS 3,549,212 12/1970 Leiber ................................. 303/119
3,550,966 12/1970 Leiber ................................. 303/68 X
3,948,568 4/1976 Leiber ................................. 303/119
4,090,739 5/1978 Iio ..................................... 303/119 X

FOREIGN PATENT DOCUMENTS 2026114 1/1980 United Kingdom .
2071245 9/1981 United Kingdom ................. 303/119

Primary Examiner—Douglas C. Butler
Attorney, Agent, or Firm—McDougall, Hersh & Scott

[57] ABSTRACT

A brake fluid pressure control apparatus in a skid control system includes electromagnetic valves arranged between a master cylinder and a wheel cylinder, receiving control signals of a control unit measuring the skid condition of the wheel to control a brake fluid pressure to the wheel cylinder; a hydraulic reservoir reserving the brake fluid discharged through the electromagnetic valves from the wheel cylinder; a pressure fluid supply conduit connecting the master cylinder with the electromagnetic valves and containing a first check valve which allows the flow of fluid in the direction of the electromagnetic valves; a fluid pump for returning brake fluid from the hydraulic reservoir into a portion of the fluid pressure supply conduit between the first check valve and the electromagnetic valves; a pressure fluid return conduit connecting the master cylinder with the wheel cylinder and containing a second check valve which allows the flow of fluid in the direction of the master cylinder; and a controllable check valve device arranged in the pressure fluid supply conduit, including the first check valve and a control portion responsive to a fluid pressure of the master cylinder or the outlet of the fluid pump, the control portion controlling to permit the first check valve to make the free communication between the master cylinder and the electromagnetic valves when the fluid pressure to the control portion is lower than a predetermined pressure.

16 Claims, 5 Drawing Figures

BRAKE FLUID PRESSURE CONTROL APPARATUS IN SKID CONTROL SYSTEM

BACKGROUND OF THE INVENTION

1. Field of the Invention

This invention relates to a brake fluid pressure control apparatus in a skid control system for a vehicle having at least one wheel and a brake for the wheel in which the brake fluid pressure to the wheel cylinder of the brake for the wheel is controlled in accordance with the rotational condition or skid condition of the wheel, and more particularly to a brake fluid pressure control apparatus of the type in which, when the brake for the wheel is relieved, brake fluid discharged through a fluid pressure control valve device from the wheel cylinder of the brake is returned to a pressure fluid supply conduit connected to a master cylinder by a fluid pump.

2. Description of the Prior Art

Recently, various kinds of skid control systems have been developed for a vehicle having at least one wheel and a brake for the wheel, by which skid control operation for the wheel is performed to avoid a locked wheel condition and obtain good braking performance on any road. In any of the skid control systems, the rotational condition or skid condition of the wheel such as deceleration, slip and acceleration is measured by the control unit which receives the detecting signal of the wheel speed sensor which is associated with the wheel for detecting the rotational speed of the wheel. The brake fluid pressure to the brake for the wheel is controlled on the basis of the measurement of the control unit.

Methods for measuring the rotational condition or skid condition of the wheel can be roughly classified into three. In the first method, slip of the wheel is obtained from the vehicle speed and the wheel speed, and the obtained slip of the wheel is compared with a predetermined slip. In the second method, acceleration or deceleration of the wheel is obtained, and the obtained acceleration or deceleration of the wheel is compared with a predetermined acceleration or deceleration. And in the third method, slip and acceleration or deceleration of the wheel are obtained from the vehicle speed and wheel speed, and the obtained slip and acceleration or deceleration of the wheel are compared with the predetermined slip and acceleration or deceleration.

A brake fluid pressure control apparatus is arranged between a master cylinder as a brake pressure generating member and the brake for the wheel. Control signals from the control unit as the measurement result are supplied to the brake fluid pressure control apparatus for increasing and decreasing, or increasing, maintaining at constant, and decreasing the brake pressure to the brake for the wheel.

One example of the brake fluid pressure control apparatus includes a brake fluid pressure control valve device to which the control signals from the control unit are supplied, to control the brake fluid pressure to the wheel cylinder of the brake for the wheel, a hydraulic reservoir for reserving the brake fluid discharged through the brake fluid pressure control valve device from the wheel cylinder of the brake, when relieved, and a fluid pump for returning the brake fluid from the hydraulic reservoir into the pressure fluid supply conduit connecting the master cylinder and the brake fluid pressure control valve device.

In the example of the brake fluid pressure control apparatus, the brake fluid from the wheel cylinder of the brake is discharged into the hydraulic reservoir to relieve the brake for the wheel, and it is returned to the pressure fluid supply conduit by the fluid pump. When the brake for the wheel is relieved, the brake fluid pressure control valve device takes the position to reduce the brake pressure, and therefore to cut off the communication between the master cylinder and the wheel cylinder of the brake for the wheel. Accordingly, the fluid pressure of the brake fluid returned by the fluid pump is applied to the piston of the master cylinder connected to the brake pedal which is treaded by the foot of the drive. The brake pedal is pushed against the tread of the driver. Thus, whenever the brake fluid pressure to the wheel cylinder of the brake changes, the piston of the master cylinder is displaced backwards and forwards. That is called "kick-back". The driver feels disagreeable. The pedal feeling is bad.

In order to solve the above described problem, this applicant proposed the brake fluid pressure control apparatus in which a first check valve is arranged in a pressure fluid supply conduit connecting a master cylinder and a fluid pressure control valve device, being opened when the brake fluid flows from the master cylinder toward the fluid pressure control valve device, an outlet of a fluid pump is connected to the pressure fluid supply conduit between the first check valve and the fluid pressure control valve device, and a second check valve is arranged in a pressure fluid return conduit connecting the master cylinder and the wheel cylinder, being opened when the brake fluid flows from the wheel cylinder toward the master cylinder. When the brake fluid is returned to the pressure fluid supply conduit by the fluid pump, it is checked from flowing toward the master cylinder by the first check valve. Thus, the above-described "kick-back" phenomenon can be avoided. When the brake fluid pressure of the master cylinder is decreased, the brake fluid returns through the second check valve to the master cylinder from the wheel cylinder.

However, in the above-described apparatus, the brake fluid pressure in the wheel cylinder cannot be lowered under the minimum actuatable pressure of the second check valve which amounts, for example, to 0.5 to 1.0 kg/cm$^2$. In other words, the brake fluid cannot flow toward the master cylinder under the minimum actuatable pressure. Thus, after the brake pedal is released from treading, some pressure, although it is very low, remains applied to the wheel cylinder. Particularly, when the brake is of the disc brake type, braking parts rub with each other due to the residual pressure of the wheel cylinder. The parts wear, resulting in deterioration and shortening of the life time of the brake. The vehicle running resistance becomes higher. That is uneconomical.

SUMMARY OF THE INVENTION

An object of this invention is to provide a brake fluid pressure control apparatus in a skid control system in which, the pedal feeling of the driver, when the driver treads the brake pedal, is good, and when the driver releases the brake pedal from treading, brake fluid can flow back from a wheel cylinder into a master cylinder so that the brake fluid pressure in the wheel cylinder becomes substantially zero.

Another object of this invention is to provide a brake fluid pressure control apparatus in a skid control system in which the life time of the brake can be improved.

In accordance with an aspect of this invention, a brake fluid pressure control apparatus in a skid control system for a vehicle having at least one wheel and a brake for the wheel includes: (A) a fluid pressure control valve device arranged between a master cylinder and a wheel cylinder of a brake for the wheel, the fluid pressure control valve device receiving control signals of a control unit measuring the skid condition of the wheel to control the brake fluid pressure to the wheel cylinder; (B) a hydraulic reservoir which, when the brake fluid pressure to the wheel cylinder is decreased with control of the fluid pressure control valve device, reserves the brake fluid discharged through the fluid pressure control valve device from the wheel cylinder; (C) a pressure fluid supply conduit connecting the master cylinder with the fluid pressure control valve device; (D) a fluid pump for returning the brake fluid from the hydraulic reservoir into the pressure fluid supply conduit; and (E) a controllable check valve device arranged in the pressure fluid supply conduit, including a control portion responsive to a fluid pressure in the skid control system, the control portion permitting the controllable check valve device to make the free communication between the master cylinder and the fluid pressure control valve device when the fluid pressure is lower than a predetermined pressure, and permitting the controllable check valve device to open when the fluid pressure is higher than the predetermined pressure, and only when brake fluid flows from the master cylinder toward the fluid pressure control valve device, and the outlet of the fluid pump being connected to the pressure fluid supply conduit between the controllable check valve device and the fluid pressure control valve device.

The foregoing and other objects, features, and advantages of the present invention will be more readily understood upon consideration of the following detailed description of the preferred embodiment of the invention, taken in conjunction with the accompanying drawings.

DESCRIPTION OF THE PREFERRED EMBODIMENTS

Next, brake fluid pressure control apparatus in skid control systems according to embodiments of this invention will be described with reference to the drawings.

Figure 1:
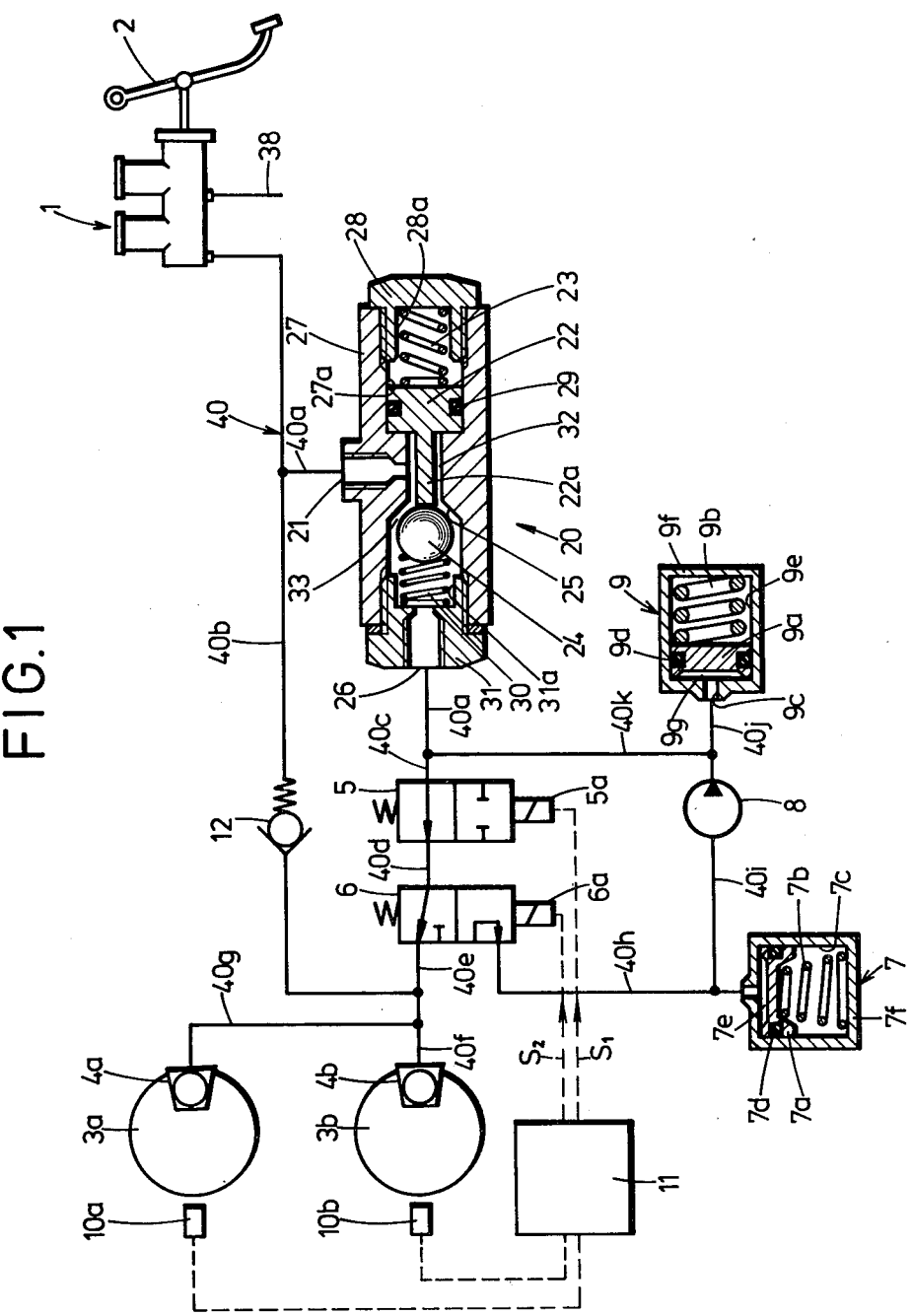
FIG. 1 is a schematic view of a brake fluid pressure control apparatus in a skid control system according to a first embodiment of this invention.

FIG. 1 shows a brake fluid pressure control apparatus in a skid control system according to a first embodiment of this invention. It is applied to rear wheels of the vehicle. In FIG. 1, a tandem master cylinder 1 has the well-known structure, and it includes first and second pistons connected through a spring with each other. The first piston is connected to a brake pedal 2 to be treaded by the driver. The cylinder body and, the first and second pistons define first and second brake fluid pressure generating chambers, although not shown. The first brake fluid pressure generating chamber is connected through a conduit 38 to wheel cylinders of the brakes for the front wheels. The second fluid pressure generating chamber communicates with a conduit 40. The conduit 40 is divided into a pressure fluid supply conduit 40a and a pressure fluid return conduit 40b.

The pressure fluid supply conduit 40a is connected through a controllable check valve device 20 to be hereinafter described in detail, a conduit 40c, an electromagnetic inlet valve 5, a conduit 40d, an electromagnetic outlet valve 6, conduits 40e, 40f and 40g to wheel cylinders 4a and 4b of brakes for rear wheels 3a and 3b which are schematically shown. A brake fluid pressure control valve device is constituted by the electromagnetic inlet valve 5 and the electromagnetic outlet valve 6.

On the other hand, the pressure fluid return conduit 40b is connected through a check valve 12 and the conduits 40f, and 40g to the wheel cylinders 4a and 4b of the brakes for the rear wheels 3a and 3b.

The controllable check valve device 20 to be hereinafter described in detail, arranged in the pressure fluid supply conduit 40a, keeps being open when the brake fluid pressure of the master cylinder 1 is lower than a predetermined pressure. And it is opened beyond the predetermined pressure of the brake fluid pressure of the master cylinder 1 only when brake fluid flows from the master cylinder 1 toward the electromagnetic inlet valve 5. Accordingly, under the predetermined pressure, brake fluid can flow through the controllable check valve device 20 both from the master cylinder 1 toward the inlet valve 5 and from the inlet valve 5 toward the master cylinder 1. However, beyond the predetermined pressure, brake fluid can flow through the controllable check valve device 20 only from the master cylinder 1 toward the inlet valve 5, and it cannot flow from the inlet valve 5 toward the master cylinder 1.

The check valve 12 arranged in the pressure fluid return conduit 40b is opened when brake fluid flows from the wheel cylinders 4a and 4b toward the master cylinder 1.

A supply opening of the electromagnetic outlet valve 6 is connected through the conduits 40e, 40f and 40g to the wheel cylinders 4a and 4b. A discharge opening of the electromagnetic outlet valve 6 is connected through a conduit 40h to a hydraulic reservoir 7. In the hydraulic reservoir 7, a piston 7a is slidably supported by a relatively weak spring 7b, in a bore 7c of a body 7f, and a seal ring 7d is fitted to the piston 7a. A reserving chamber 7e' is formed by the body 7f and the piston 7a, communicating with the conduit 40h. The hydraulic reservoir 7 is connected through a conduit 40i to an inlet of a fluid pump 8. An outlet of the fluid pump 8 is connected through a conduit 40j to a hydraulic accumulator 9. In the hydraulic accumulator 9, a piston 9a is slidably supported by a relatively strong spring 9b, in a bore 9e of a body 9f, and a seal ring 9d is fitted to the piston 9a. An accumulating chamber 9g is formed by the body 9f and the piston 9a, communicating through an opening 9c with the conduit 40j which communicates, in turn, with a conduit 40k which branches from the pressure fluid supply conduit 40a.

Wheel speed sensors 10a and 10b are associated with the rear wheels 3a and 3b, and they generate pulse signals having frequencies proportional to the rotational speeds of the rear wheels 3a and 3b. The pulse signals of the wheel speed sensors 10a and 10b are supplied to a control unit 11 which has the well-known circuits. On the basis of the detecting outputs of the wheel speed sensors 10a and 10b, the skid condition or rotational condition of the rear wheels 3a and 3b, namely wheel speeds of the rear wheels 3a and 3b, slips thereof, and accelerations or decelerations thereof are calculated or measured by the control unit 11. Control signals $S_1$ and $S_2$ as the calculation or measurement results are generated from the control unit 11, and are supplied to solenoid portions 5a and 6a of the electromagnetic inlet and outlet valves 5 and 6. Dash lines represent electric lead wires.

Although schematically shown, the electromagnetic inlet and outlet valves 5 and 6 have well-known constructions, and they are called also "cut-off valve", and "discharge valve", respectively. When the control signals $S_1$ and $S_2$ of the control unit 11 are at higher levels "1", the electromagnetic inlet and outlet valves 5 and 6 are energized to take lower positions respectively. And when the control signals $S_1$ and $S_2$ of the control unit 11 are at lower levels "0", the electromagnetic inlet and outlet valve 5 and 6 are deenergized to take upper positions, respectively.

When the solenoid portions 5a and 6a of the inlet and outlet valves 5 and 6 are not energized, the master cylinder 1 communicates with the wheel cylinders 4a and 4b of the wheels 3a and 3b so that the brake pressure to the wheels 3a and 3b are increased. When both of the solenoid portions 5a and 6a of the inlet and outlet valves 5 and 6 are energized, the communication between the master cylinder 1 and the wheel cylinders 4a and 4b is cut off, and the discharge opening of the outlet valve 6 is connected to the wheel cylinders 4a and 4b to discharge brake fluid into the reservoir 7, so that the brake pressures to the wheels 3a and 3b are lowered. The brake fluid is returned through the conduits 40i and 40k to the conduit 40c by the pump 8. And when only the solenoid portion 5a of the inlet valve 5 is energized, the communication between the master cylinder 1 and the wheel cylinders 4a and 4b is cut off, and however, the supply opening of the outlet valve 6 remain connected with the wheel cylinders 4a and 4b, so that the brake pressure to the wheels 3a and 3b are maintained at constant.

Next, there will be described the details of the controllable check valve device 20 arranged in the pressure fluid supply conduit 40a.

In the check valve device 20, a main body 27 is open at both ends. A right opening is closed by a cover member 28. A left opening is fluid-tightly closed through a seal ring by a cover member 31 in which a fluid path 26 is formed. A stepped piston 22 sealed with a seal ring 29 is slidably fitted to a stepped cylindrical bore 27a of the main body 27, and it is urged leftwards by a spring 23 which is received in a recess 28a of the cover member 28. It normally contacts with a stepped portion of the cylindrical bore 27a as shown in FIG. 1. An annular path 32 is formed between a small-diameter portion 22a of the stepped piston 22 and the inside wall of the man body 27 in a small diameter portion of the stepped cylindrical bore 27a. The annular path 32 communicates with an inlet opening 21 formed in the main body 27.

A valve ball 24 is arranged in a left large-diameter portion of the stopped cylindrical bore 27a, and it is urged rightwards by a spring 30 which is received in a recess 31a formed in the cover member 31, so that it normally contacts with the top end of the stepped piston 22, as shown in FIG. 1. The boundary portion between the small-diameter portion of the stepped cylindrical bore 27a and the left large-diameter portion thereof, facing to the valve ball 24, is tapered to form a valve set 25. A usual check valve is constituted by the valve ball 24, the spring 30 and the valve seat 25. Normally, the valve ball 24 is separated from the valve seat 25, as shown in FIG. 1, and a path 33 is formed between the valve ball 24 and the inside wall of the main body 27. The path 26 of the cover member 31 functions as an outlet opening. In the shown condition, it communicates through the left large-diameter portion of the stepped cylindrical bore 27a, pathes 33 and 32 with the inlet opening 21. The inlet opening 21 and the outlet opening 26 are connected to the master cylinder side pressure fluid supply conduit 40a and the wheel cylinder side pressure fluid supply conduit 40a, respectively.

Next, there will be described operation of the above-described apparatus.

The driver starts to tread the brake pedal 2 in order to brake the vehicle running at constant speed. It is judged by the control unit 11 receiving the detecting signals of the wheel speed sensors 10a and 10b that the deceleration and slip of the wheels 3a and 3b do not still reach the predetermined slip and deceleration at the braking start. The control signals $S_1$ and $S_2$ of the control unit 11 are at the lower levels "0". The solenoid portions 5a and 6a of the inlet and outlet valves 5 and 6 are deenergized. The conduits 40c and 40e are made to communicate with each other. The brake fluid from the master cylinder 1 flows through the pressure fluid supply conduit 40a, the controllable check valve device 20, the conduit 40c, the inlet and outlet valves 5 and 6, and the conduits 40e, 40f and 40g into the wheel cylinders 4a and 4b to brake the wheels 3a and 3b. On the other hand, the brake fluid from the master cylinder 1 is checked by the check valve 12. Accordingly, it cannot flow through the pressure fluid return conduit 40b.

At the start of the braking operation, the controllable check valve device 20 is in the shown condition. The brake fluid from the master cylinder 1 is supplied through the inlet opening 21, the paths 32 and 33, and the outlet opening 26 into the inlet valve 5. When the brake fluid pressure of the master cylinder 1, or that of the inlet opening 21 reaches the predetermined pressure, for example, 10 kg/cm$^2$, the stepped piston 22 is moved rightwards against the spring 23. Since the top end of the stepped piston 22 is separated from the valve ball 24, the latter can contact with the valve seat 25 by spring action of the spring 30. However, during the braking operation, the valve ball 24 is pushed leftwards by the brake fluid pressure transmitted from the inlet opening 21 against the spring 30, and it does not contact with the valve seat 25. The path 33 is kept so as to flow the brake fluid from the inlet opening 21 toward the outlet opening 26. If brake fluid flows from the outlet opening 26, the valve ball 24 comes to contact with the valve seat 25, since the stepped piston 22 is located at the right position or withdrawn position against the spring 23 when the brake fluid pressure at the inlet opening 21 is higher than the predetermined pressure. Accordingly, the brake fluid from the outlet opening 26 is checked by the valve ball 24.

When the brake fluid pressure at the inlet opening 21 is lower than the predetermined pressure, the piston 22 is located at the shown position or it is not moved so rightwards as to contact the valve ball 24 with the valve seat 25, so that brake fluid can flow both from the inlet opening 21 toward the outlet opening 26 and from the outlet opening 26 toward the inlet opening 21. However, when the brake fluid pressure at the inlet opening 21 is higher than the predetermined pressure, the controllable check valve device 20 functions as a usual check valve so that brake fluid can flow from the inlet opening 21 toward the outlet opening 26 by pushing leftwards the valve ball 24, and it cannot flow from the outlet opening 26 toward the inlet opening 21 because of the contact between the valve ball 124 and the valve seat 24.

With the increase of the brake fluid pressure to the wheel cylinders 4a and 4b, the slip or deceleration of the wheels 3a and 3b meanwhile reaches the predetermined slip or deceleration. The levels of the control signals $S_1$ and $S_2$ becomes higher "1". The solenoid portions 5a and 6a of the inlet and outlet valves 5 and 6 are energized to cut off the communication between the conduits 40a and 40e, and to make the communication between the conduits 40e and 40h. Accordingly, the brake fluid from the wheel cylinders 4a and 4e flows through the conduits 40f, 40g, 40e and 40h into the reservoir 7. The fluid pump 8 is so designed as to start to be driven at the time when any one of the control signals $S_1$ and $S_2$ becomes higher "1", by a not shown electric motor, and it continues to be driven during the skid control operation. The brake fluid in the reservoir 7 is pressurized by the fluid pump 8, and it is led through the conduit 40i into the pressure fluid supply conduit 40a and the accumulator 9. However, since the controllable check valve device 20 is arranged in the pressure fluid supply conduit 40a, the brake fluid cannot flow to the master cylinder 1, and it is accumulated in the accumulator 9. No "kick-back" is imparted to the brake pedal 2. The pedal feeling of the driver is good.

When the deceleration of the wheels 3a and 3b becomes lower than the predetermined deceleration level by function of the inlet and outlet valves 5 and 6, or when the acceleration of the wheels 3a and 3b becomes higher than the predetermined acceleration level, the control signal $S_2$ becomes lower "0", while the control signal $S_1$ remains higher "1", according to the control unit 11 of this embodiment. Accordingly, the solenoid portion 5a of the inlet valve 5 remain energized, while the solenoid portion 6a of the outlet valve 6 is deenergized. The communication between the conduits 40a and 40d is cut off, and the communication between the conduits 40e and 40h are cut off. Thus, the brake fluid pressure to the wheel cylinders 4a and 4b is maintained at constant, or at the reduced value. Although the fluid pump 8 continues to be driven to lead the brake fluid from the reservoir 7 into the conduit 40k, no "kick-back" is imparted to the brake pedal 2.

When the skid condition of the wheels 3a and 3b comes within the permissible range, both of the control signals $S_1$ and $S_2$ become lower "0" to make the communication between the conduits 40a and 40e and again to increase the brake to the wheels 3a and 3b.

The above-described control operations are repeated. Meanwhile, the vehicle speed reaches the desired speed, or the vehicle stops. The brake pedal 2 is released from treading. The fluid pressure at the side of the master cylinder 1 with respect to the check valve 12 becomes lower than the fluid pressure at the side of the wheel cylinders 4a and 4b with respect to it, with the release of the brake pedal 2, in the pressure fluid return conduit 40b. The brake fluid flows back through the conduits 40f, 40g, and 40b, and the check valve 12 into the master cylinder 1 from the wheel cylinders 4a and 4b. Thus, the wheels 3a and 3b are almost released from braking.

However, when the fluid pressure of the wheel cylinder side with respect to the check valve 12 becomes lower than the minimum actuatable pressure of the check valve 12 which is, for example, determined by spring strength of a spring as a constituent, the check valve 12 cannot be opened, and the brake fluid cannot flow from the wheel cylinders 4a and 4b toward the master cylinder 1.

On the other hand, before the fluid pressure of the wheel cylinder side with respect to the check valve 12 becomes lower than the minimum actuatable pressure of the check valve 12, the brake fluid pressure at the inlet opening 21 in the controllable check valve device 20 becomes lower than the predetermined pressure. Accordingly, although the brake fluid does not flow through the check valve 12, it flows through the outlet valve 6, the inlet valve 5 and the controllable check valve device 20 into the master cylinder 1 from the wheel cylinders 4a and 4b. The solenoid portions 5a and 6a of the inlet and outlet valves 5 and 6 are deenergized with, or before the release of the pedal treading. The communication between the master cylinder 1 and the wheel cylinders 4a and 4b, is made through the inlet and outlet valves 5 and 6.

Thus, when the brake pedal 2 is released from treading, the brake fluid returns to the master cylinder 1 so that the brake fluid pressure at the wheel cylinders 4a and 4b becomes substantially zero.

Figure 2:
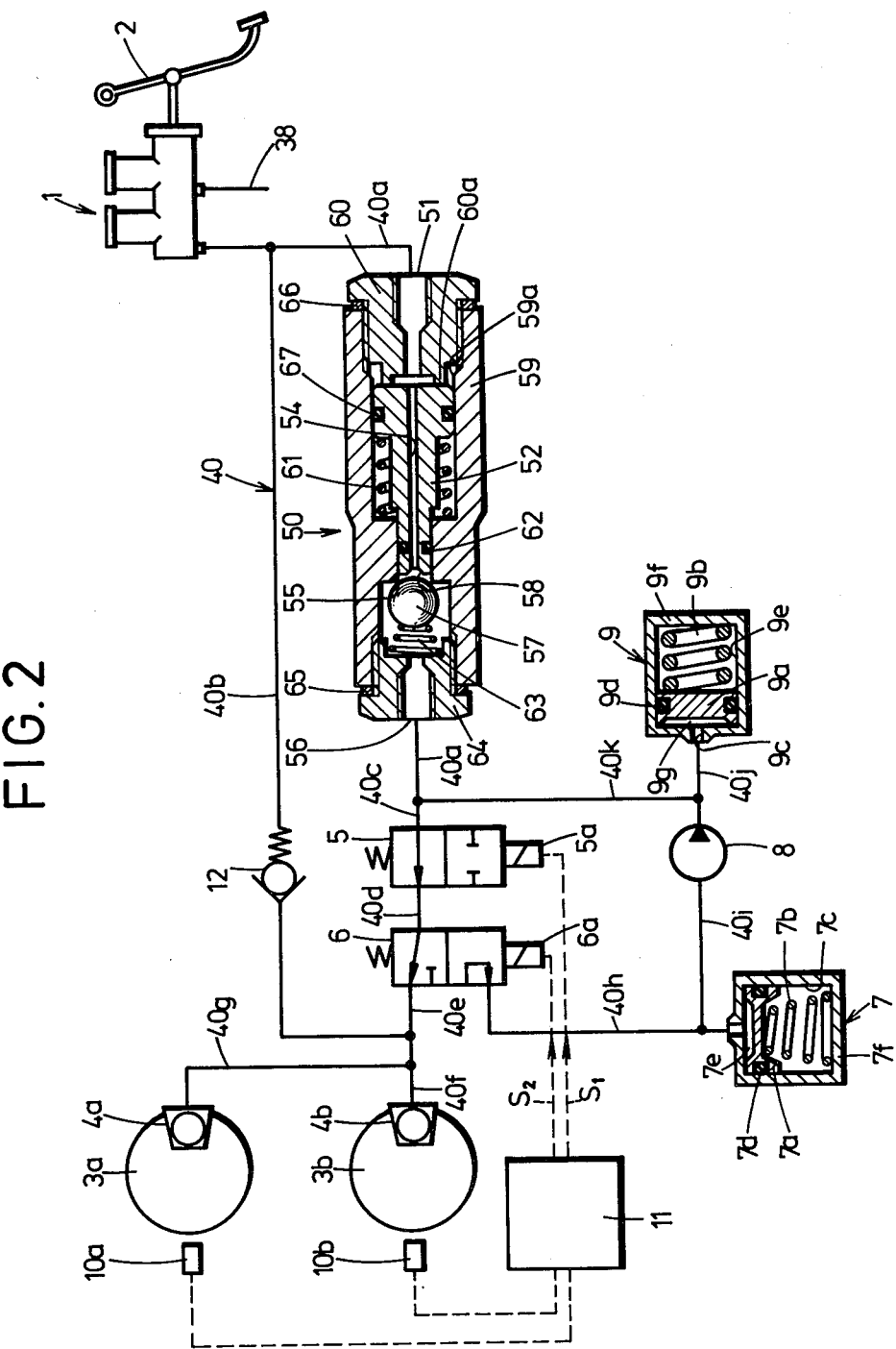
FIG. 2 is a schematic view of a brake fluid pressure control apparatus in a skid control system according to a second embodiment of this invention.

FIG. 2 shows a fluid pressure control apparatus in a skid control system according to a second embodiment of this invention. Parts in this embodiment which correspond to those in FIG. 1, are denote by the same reference numerals, the description of which will be omitted.

The apparatus of this embodiment is different from that of FIG. 1 in constructions of a controllable check valve device. Referring to FIG. 2, a controllable check valve device 50 is arranged in the pressure fluid supply conduit 40a. In the controllable check valve device 50, a main body 59 is open at both ends. Openings are fluid-tightly covered by cover members 60 and 64 which are screwed to the main body 59, and sealed with seal rings 65 and 66. A stepped piston 52 sealed with seal rings 62 and 67 is slidably fitted to a stepped cylindrical bore 59a of the main body 59. A compression spring 61 is arranged between an inner stepped portion of the main body 59 and a large-diameter portion of the stepped piston 52 to urge the stepped piston 52 rightwards. Normally, the stepped piston 52 contacts with an annular projection 60a of the cover member 60. A chamber is formed between the stepped piston 52 and the cover member 60. An inlet opening 51 is made in the cover member 60, communicating with the chamber. The pressure fluid supply conduit 40a from the master cylinder 1 is connected to the inlet opening 51 of the cover member 60. A through hole 54 is made in the stepped piston 52, and it communicates with the inlet opening 51.

Figure 3:
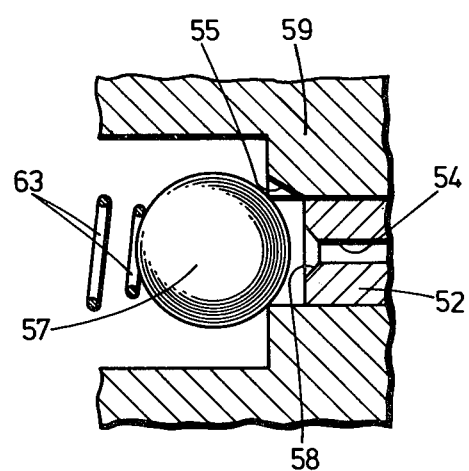
FIG. 3 is an enlarged cross-sectional view of an important part of the apparatus of FIG. 2.

A valve ball 57 is arranged in a left large-diameter portion of the cylindrical bore 59a, and it is urged rightwards by a spring 63 which is received in an inner recess of the cover member 64. Normally, the valve ball 57 contacts with the stepped portion of the main body 59. As clearly shown in FIG. 3, a cut-out groove 55 is slantly formed in the stepped portion of the main body 59. Normally, the top end of the stepped piston 52 is separated from the valve ball 57. Accordingly, although the valve ball 57 contacts with the stepped portion of the main body 59, an outlet opening 56 made in the cover member 64 communicates through the cut-out groove 55, the through hole 54 of the stepped piston 52 and the chamber with the inlet opening 51. The outlet opening 56 is connected to the pressure fluid supply conduit 40a. As clearly shown in FIG. 3, the top end of the through hole 54 of the stepped piston 52 is tapered to form a valve seat 58 for the valve ball 57.

Next, there will be described operation of the controllable check valve device 50.

When the brake pedal 2 is trodden to brake the vehicle, the brake fluid from the master cylinder 1 flows through the conduit 40a, the inlet opening 51, the chamber, the through hole 54 of the stepped piston 52, the cut-out groove 55, and the outlet opening 56 into the inlet valve 5. At the initial stage of the braking operation, the check valve constituted by the valve ball 57, the spring 63 and the valve seat 58 makes the free communication between the inlet opening 51 and the outlet opening 56. Accordingly, brake fluid can flow both from the inlet opening 51 toward the outlet opening 56 and from the outlet opening 56 toward the inlet opening 51. However, when the brake pedal 2 is trodden, the brake fluid flows exclusively from the inlet opening 51 towards the outlet opening 56. When the brake fluid pressure of the master cylinder 1 or that at the inlet opening 51 reaches a predetermined pressure which is, for example, 10 kg/cm$^2$, the stepped piston 52 is moved leftwards against the spring 61. The top end of the stepped piston 52 comes to contact with the valve ball 57, and pushes the latter leftwards against the spring 63. Accordingly, it becomes possible that the valve ball 57 sits on the valve seat 58, since the valve ball 57 is urged rightwards by the spring 63. However, since the brake fluid pressure from the master cylinder 1 increases, the valve ball 57 is separated from the top end of the stepped piston 52 to flow the brake fluid toward the outlet opening 56. Flow of brake fluid from the outlet opening 56 is checked by seating the valve ball 57 onto the valve seat 58. Thus, the controllable check valve device 50 functions as a usual check valve when the brake fluid pressure of the master cylinder 1 is higher than the predetermined pressure.

The same skid control operation as in the apparatus of FIG. 1 is performed by the apparatus of FIG. 2. The discharging pressure of the fluid pump 8 is not applied to the master cylinder 1. The pedal feeling is good. When the brake pedal 2 is released from treading, the brake fluid from the wheel cylinders 4a and 4b returns to the master cylinder 1 so that the brake fluid pressure of the wheel cylinders 4a and 4b becomes substantially zero.

Figure 4:
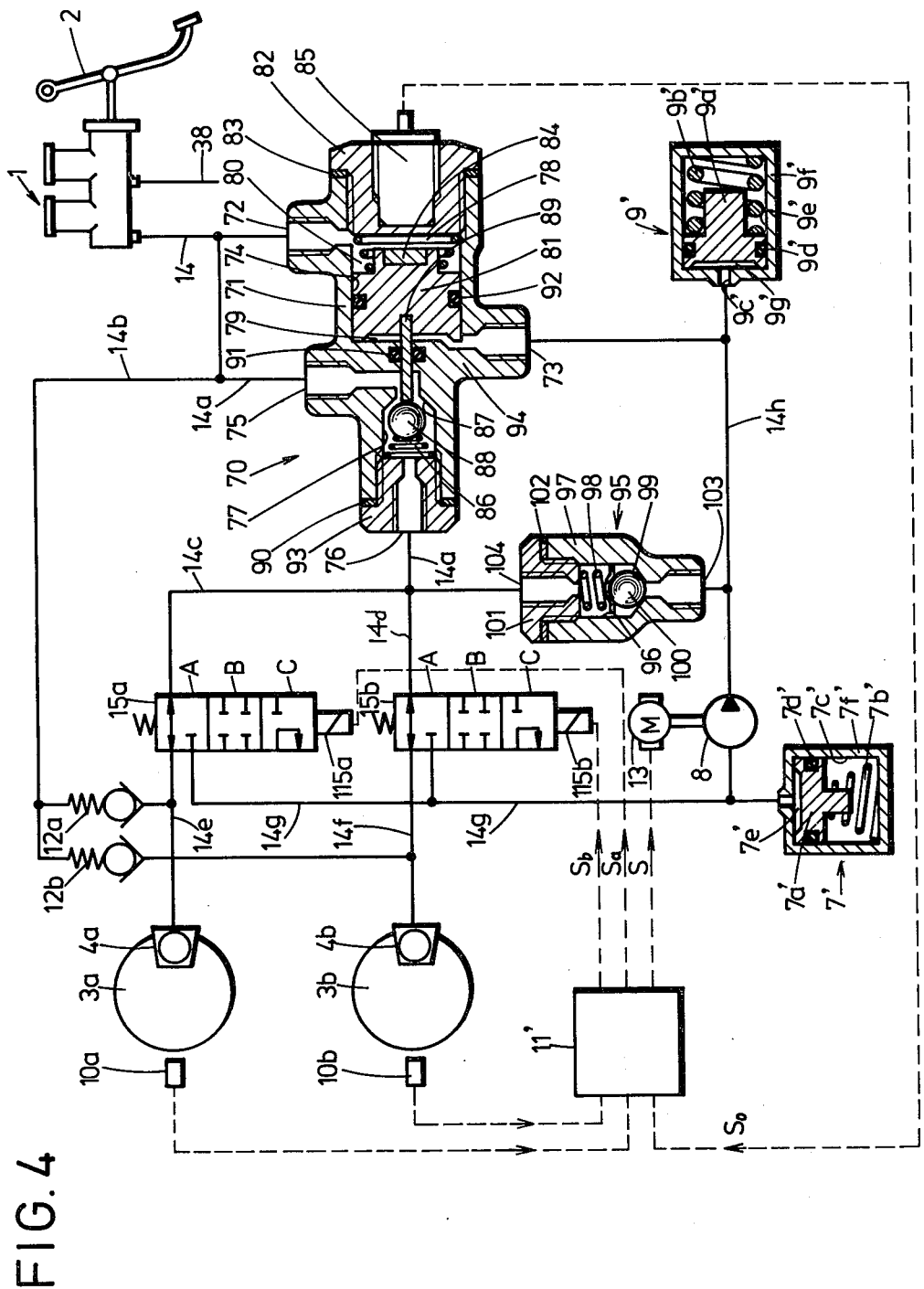
FIG. 4 is a schematic view of a brake fluid pressure control apparatus in a skid control system according to a third embodiment of this invention.

FIG. 4 shows a fluid pressure control apparatus in a skid control system according to a third embodiment of this invention. Parts in this embodiment which correspond to those in FIG. 1, are denoted by the same reference numerals, the description of which will be omitted.

In FIG. 4, the first fluid pressure generating chamber of the master cylinder 1 may be connected through the conduit 38 to the same apparatus as shown in FIG. 4 for the other wheels. A conduit 14 is connected to the second fluid pressure generating chamber of the master cylinder 1, and it is divided into a pressure fluid supply conduit 14a and a pressure fluid return conduit 14b.

The pressure fluid supply conduit 14a is connected through a controllable check valve device 70 to be hereinafter described in detail, and conduits 14c and 14d to electromagnetic three-position change-over valves 15a and 15b.

A fluid pressure control valve is constituted by the electromagnetic three-position change-over valves 15a and 15b. Feeding openings of the change-over valves 15a and 15b are connected through conduits 14e and 14f to the wheel cylinders 4a and 4b of the wheels 3a and 3b. Discharging openings thereof are connected through a conduit 14g to a hydraulic reservoir 7'. In the hydraulic reservoir 7', a piston 7a' is slidably supported by a relatively weak spring 7b' in a bore 7c' of a body 7f, and a seal ring 7d' is fitted to the piston 7a'. A reserving chamber 7e' is formed by the body 7f, and the piston 7a' communicating with the conduit 14g. As in the reservoir 7 of FIG. 1, the brake fluid discharged from the wheel cylinders 4a and 4b is temporarily reserved in the chamber 7e' of the reservoir 7'.

The conduit 14g is further connected to the inlet of the fluid pump 8 which is driven by an electric motor 13. The outlet of the fluid pump 8 is connected trough a conduit 14h to a hydraulic accumulator 9', a pressure adjusting valve 95 to be hereinafter described in detail, and the controllable check valve device 70.

In the hydraulic accumulator 9', a piston 9a' is slidably supported by a relatively strong spring 9b' in a bore 9e' of a body 9f, and a seal ring 9d' is fitted to the piston 9a'. An accumulating chamber 9g' is formed by the body 9f and the piston 9a', communicating through an opening 9c' with the conduit 14h. When a brake fluid pressure at the opening 9c' becomes higher than a predetermined value which is, for example, 150 kg/cm$^2$, the piston 9a' starts to be moved against the spring 9b' so as to accumulate brake fluid.

On the other hand, the pressure fluid return conduit 14b is connected through check valves 12a and 12b to the wheel cylinders 4a and 4b, respectively. The check valves 12a and 12b are opened when brake fluid flows from the wheel cylinders 4a and 4b toward the master cylinder 1.

The outputs of the wheelspeed sensors 10a and 10b are supplied to a control unit 11' which has the well-known circuits. On the basis of the detecting outputs of the wheel speed sensors 10a and 10b, the skid condition or rotational condition of the rear wheels 3a and 3b, namely wheel speeds of the rear wheels 3a and 3b, slips thereof, and accelerations or decelerations thereof are calculated or measured by the control unit 11'. Control signals Sa and Sb as the calculation or measurement results are generated from the control unit 11', and are supplied to solenoid portions 115a and 115b of the electromagnetic change-over valves 15a and 15b. Dash lines represent electric lead wires.

Although schematically shown, the electromagnetic change-over valves 15a and 15b have well-known constructions. When the control signals Sa and Sb are "0", the change-over valves 15a and 15b take first positions A for increasing the brake pressure to the brake for the wheel, respectively. In the first position A, the master cylinder side and the wheel cylinder side are made to communicate with each other. When the control signals Sa and Sb are "½", the change-over valves 15a and 15b take second positions B for maintaining the brake pressure to the brake at constant, respectively. In the second position B, the communications between the master cylinder side and the wheel cylinder side, and between the wheel cylinder side and the reservoir side are interrupted. When the control signals Sa and Sb are "1", the change-over valves 15a and 15b take third position C for decreasing the brake pressure to the brake, respectively. In the third position C, the communication between the master cylinder side and the wheel cylinder side is interrupted, while the communication between the wheel cylinder side and the reservoir side is made. The brake fluid is discharged through the conduit 14g into the reservoir 7' from the wheel cylinders 4a and 4b.

The control unit 11' further generates a drive signal S for the motor 13. When anyone of the control signals Sa and Sb becomes initially "½" or "1", the drive signal S is generated, and it is kept during the skid control operation. The drive signal S is supplied to the motor 13. Although the motor 13 is not shown in FIG. 1, the same drive signal is supplied to it also in FIG. 1. Further, such a signal $S_o$ is supplied to the control unit 11' as to detect that the controllable check valve device 70 to be hereinafter described in detail functions as a usual check valve.

Next, there will be described the details of the controllable check valve device 70 arranged in the pressure fluid supply conduit 14a.

Two bores 74 and 77 are formed in a main body 71. They are partitioned by a partition wall portion 94 of the main body 71. Inlet openings 72 and 75 are made in an upper wall portion of the main body 71. The conduit 14 is connected to the inlet opening 72. The pressure fluid supply conduit 14a branched from the conduit 14 is connected to the inlet opening 75. Accordingly, the fluid pressure of the master cylinder is transmitted to the inlet openings 72 and 75. Further, a fluid pump pressure supply opening 73 is formed in a lower wall portion of the main body 71. The outlet of the fluid pump 8 is connected through the conduit 14h to the fluid pump pressure supply opening 73.

The opening of the one bore 74 of the main body 71 is fluid-tightly covered by a cover member 82 which is screwed to the main body 71 and is sealed with a seal ring 83. The opening of the other bore 77 of the main body 71 is fluid-tightly covered by a cover member 93 which is screwed to the main body 71 and is sealed with a seal ring 90. An outlet opening 76 is made in the cover member 93. The change-over valves 15a and 15d are connected through the conduct 14a to the outlet opening 76. The latter communicates with the left bore 77 of the main body 71.

A piston 81 sealed with a seal ring 92 is slidably fitted to the right bore 74 of the main body 71, and it is urged leftwards by a compression spring 78 which is arranged between the piston 81 and the cover member 82. Normally, the piston 81 contacts with a part of the partition wall portion 94, as shown in FIG. 4. The right bore 74 is partitioned into a master cylinder pressure chamber 80 and a pump pressure chamber 79 by the piston 81. The master cylinder pressure chamber 80 communicates through the inlet opening 72 with the fluid pressure generating chamber of the master cylinder 1. The pump pressure chamber 79 communicates through the opening 73 and the conduit 14h with the outlet of the fluid pump 8.

A permanent magnet 84 is fixed in a recess of the right end portion of the piston 81. A magnetic sensing switch 85 is screwed into a recess of the cover member 82, corresponding to the permanent magnet 84. It includes a reed switch or a magneto-resistance element. When the piston 82 is moved rightwards to contact the magnet 84 with the cover member 82, as described hereinafter, the magnetic sensing switch 85 generates the detecting signal So representing that the controllable check valve device 70 functions as a usual check valve. The detecting signal So is supplied to the control unit 11'.

A valve ball 88 is arranged in the left bore 77, and it is urged rightwards by a spring 86. Normally, it contacts with a top end of a rod 89 sealed with a seal ring 91. The rod 89 slidably passes through the partitioning wall portion 94, and it is fixed to the piston 81. A stepped portion of the left bore 77 is tapered to form a valve set 87 for the valve ball 88. In the shown condition, the valve ball 88 contacting with the top end of the rod 89 is separated from the valve seat 87, so that the outlet opening 76 communicates through the left bore 77 with the inlet opening 75.

Next, there will be described the details of the pressure adjusting valve 95 arranged between the outlet of the fluid pump 8 and the outlet opening 76 of the controllable check valve device 70.

A valve bore 96 is formed in a main body 97. A valve ball 100 is arranged in the bore 96. An upper opening of the valve bore 96 is fluid-tightly closed by a cover member 101 which is screwed to the main body 97, and is sealed with a seal ring 102. An outlet opening 104 is formed in the cover member 101, communicating with the valve bore 96, and it is connected to the pressure fluid supply conduit 14a. A stepped portion of the valve bore 96 is tapered to form a valve seat 99 for the valve ball 100. The valve ball 100 is urged downwards by a pressure adjusting spring 98. Normally, the valve ball 100 contacts with the valve seat 99. An inlet opening 103 is made in the lower portion of the main body 97, and it is connected through the conduit 14h to the outlet of the fluid pump 8. Normally, the communication between the inlet opening 103 and the outlet opening 104 is interrupted by the valve ball 100. When a valve opening pressure is represented by Po, an input fluid pressure at the inlet opening 103 by Pin, and an output fluid pressure at the outlet opening 104 by Pout, the output fluid pressure Pout is so adjusted as to be equal to (Pin−Po). The valve opening pressure Po is determined by a spring force of the pressure adjusting spring 98 and the opening area closed by the valve ball 100 sitting on the valve seat 99. It is, for example, 5 to 10 kg/cm².

Next, there will be described operation of the apparatus of FIG. 4.

The driver starts to tread the brake pedal 2 in order to brake the vehicle running at constant speed. It is judged by the control unit 11' receiving the detecting signals of the wheel speed sensors 10a and 10b that the deceleration and slip of the wheels 3a and 3b do not still reach the predetermined slip and deceleration at the braking start. The control signals Sa and Sb of the control unit 11' are at the lower levels "0". The solenoid portions 115a and 115b of the change-over valves 5a and 15b are deenergized. The change-over valves 15a and 15b are in the position A, respectively. The conduits 14c and 14e, and 14d and 14f are made to communicate with each other, respectively. The brake fluid from the master cylinder 1 flows through the pressure fluid supply conduit 14a, the controllable check valve device 70, the conduits 14c and 14d, valves 15a and 15b, and the conduits 14e, and 14f into the wheel cylinders 4a and 4b to brake the wheels 3a and 3b. On the other hand, the brake fluid from the master cylinder 1 is checked by the check valves 12a and 12b. Accordingly, it cannot flow through the pressure fluid return conduit 14b.

With the increase of the brake fluid pressure to the wheel cylinders 4a and 4b, the slip or deceleration of the wheels 3a and 3b meanwhile reaches the predetermined slip or deceleration. The levels of the control signals Sa and Sb become "½" or "1". The solenoid portions 115a and 115b of the valves 5 and 6 are energized by the control signals Sa and Sb, respectively. For simplification of description, it is assumed that both of the control signals Sa and Sb becomes "1". The change over valves 15a and 15b are changed over into the position C, respectively. The communication between the pressure fluid supply conduit 14a and the wheel cylinders 4a and 4b is interrupted while the communication between the wheel cylinders 4a and 4b, and the reservoir 7' is made.

When anyone of the control signals Sa and Sb becomes "½" or "1", the drive signal S is generated to drive the motor 13. The fluid pump 8 starts to be driven. The brake fluid discharged into the reservoir 7' through the conduit 14g from the wheel cylinders 4a and 4b is fed from the reservoir 7' to the conduit 14h by the fluid pump 8.

At the start of the braking operation, the piston 81 in the controllable check valve device 70 is in the position shown in FIG. 4. The discharging fluid pressure of the fluid pump 8 is supplied to the supply opening 73 of the controllable check valve device 70. The fluid pressure in the pump pressure chamber 79 of the check valve device 70 increases with the discharging fluid pressure of the fluid pump 8. When it becomes higher than the sum of the urging force of the spring 78 and fluid pressure in the master cylinder pressure chamber 80 which communicates through the inlet opening 72 with the master cylinder 1, the piston 81 is moved rightwards with the rod 89. The valve ball 88 becomes able to sit on the valve seat 87 by spring action of the spring 86. After that time, the controllable check valve device 70 functions as a usual check valve. Brake fluid can flow through the check valve device 70 from the master cylinder 1 toward the change-over valves 15a and 15b, while brake fluid cannot flow from the side of the change-over valves 15a and 15b toward the master cylinder 1.

With the rightward movement of the piston 81, the permanent magnet 84 contacts with the cover member 82. Magnetic flux from the permanent magnet 84 is sensed by the magnetic sensing switch 85. The signal So detecting that the controllable check valve device 70 functions as a usual check valve, is generated by the magnetic sensing switch 85, and it is supplied to the control unit 11'.

The discharging fluid pressure of the fluid pump 8 further increases. When it becomes higher by more than the opening pressure Po of the pressure adjusting valve 95, than the fluid pressure of the master cylinder 1, the valve ball 100 is separated from the valve seat 99 against the spring 98, so that the brake fluid from the fluid pump 8 is returned through the pressure adjusting valve 95 to the pressure fluid supply conduit 14a of the change-over valves side. However, since the valve ball 88 sits on the valve seat 87 in the controllable check valve device 70, the brake fluid cannot flow into the master cylinder 1. Accordingly, no "kick back" is imparted to the brake pedal 2.

During the skid control operation, the control signals Sa and Sb change as "0" "½" and "1". However, the fluid pump 8 always operates, and the piston 81 is located at the right position in the check valve device 70. The valve ball 88 is always able to sit on the valve seat 87. Accordingly, the controllable check valve device 70 always functions as a usual check valve.

When the change-over valves 15a and 15b are changed over into the position B, the communications between the check valve device 70 and the wheel cylinders 4a and 4b, and the wheel cylinders 4a and 4b, and the reservoir 7' are cut. The brake fluid pressure in the wheel cylinders 4a and 4b is maintained at constant. Although the fluid pump 8 always operates during the skid control operation, no "kick-back" is imparted to the brake pedal 2, since the controllable check valve device 70 functions as a usual check valve, and brake fluid cannot flow toward the master cylinder 1.

The above-described control operations are repeated. Meanwhile, the vehicle speed reaches the desired speed, or the vehicle stops. The brake pedal 2 is released from treading. The fluid pressure at the side of the master cylinder 1 with respect to the check valves 12a and 12b becomes lower than the fluid pressure at the side of the wheel cylinders 4a and 4b with respect to it, with the release of the brake pedal 2, in the pressure fluid return conduit 14b. The brake fluid flows back through the conduits 14e and 14f, check valves 12a and 12b into the master cylinder 1 from the wheel cylinders 4a and 4b. Thus, the skid control operation ends, and the wheels 3a and 3b are almost released from braking. However, when the fluid pressure of the wheel cylinder side with respect to the check valves 12a and 12b becomes lower than the minimum actuatable pressure of the check valves 12a and 12b, the check valves 12a and 12b cannot be opened, and the brake fluid cannot flow from the wheel cylinders 4a and 4b toward the master cylinder 1.

On the other hand, the fluid pump 8 stops with the end of the skid control operation, and the change-over valves 15a and 15b are in the position A. The piston 81 in the controllable check valve device 70 is located at the original position shown in FIG. 4. Accordingly, the brake fluid from the wheel cylinders 4a and 4b returns through the change-over valves 15a and 15b, and the controllable check valve device 70 into the master cylinder 1 so that the brake fluid pressure in the wheel cylinders 4a and 4b becomes nearly zero. There is no problem on a residual brake fluid pressure due to the check valves 12a and 12b.

Figure 5:
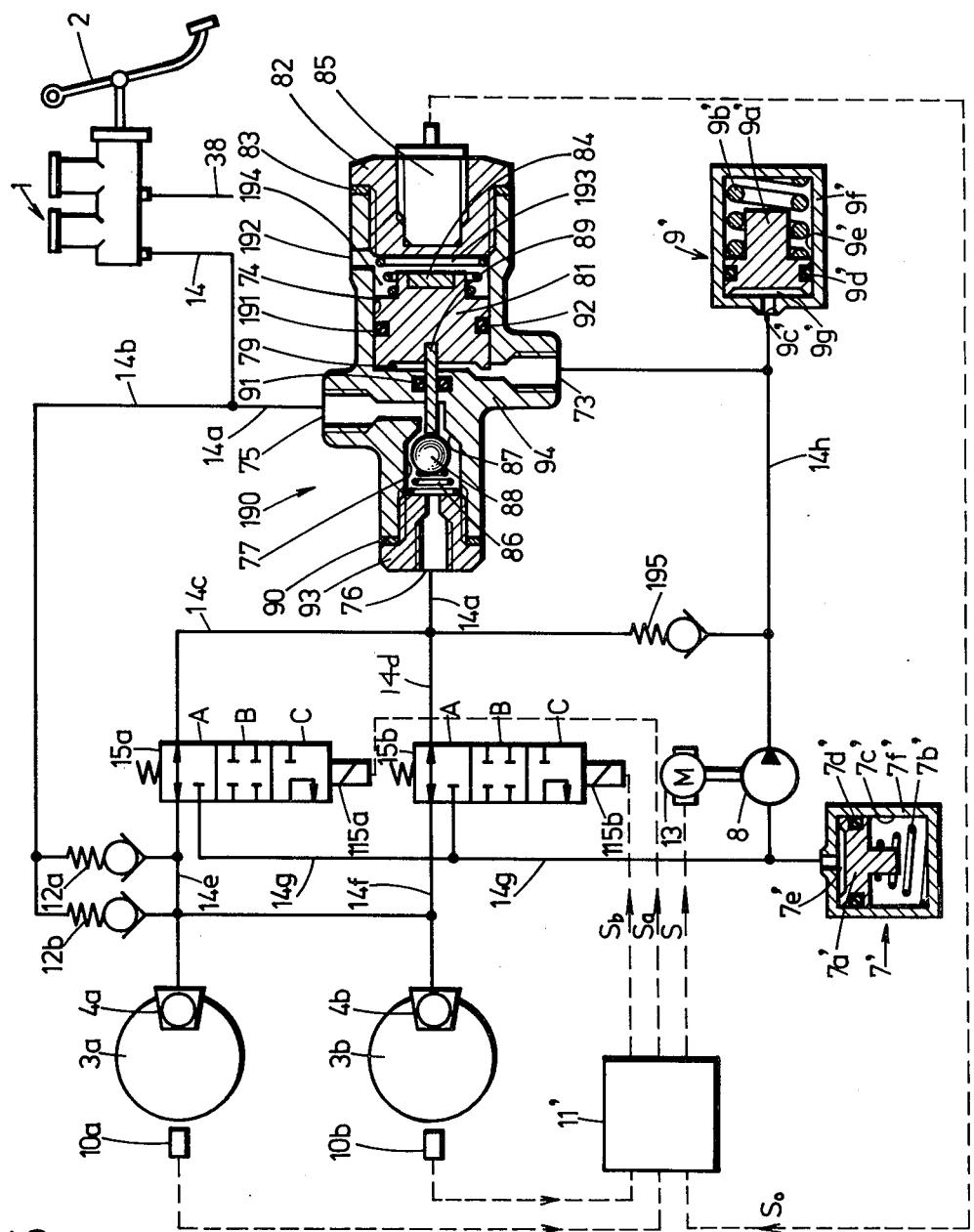
FIG. 5 is a schematic view of a brake fluid pressure control apparatus in a skid control system according to a fourth embodiment of this invention.

FIG. 5 shows a fluid pressure control apparatus in a skid control system according to a fourth embodiment of this invention. Parts in this embodiment which correspond to those in FIG. 4, are denoted by the same reference numerals, the description of which will be omitted.

The apparatus of this embodiment is different from that of FIG. 4 in constructions of a controllable check valve device, and in the fact that a check valve is used instead of the pressure adjusting valve 95.

Referring to FIG. 5, a controllable check valve device 190 is arranged in the pressure fluid supply conduit 14a. In the controllable check valve device 190, an air chamber 194 is formed instead of the master cylinder pressure chamber 80 of the controllable check valve device 70, between the piston 81 and the cover member 82 in a main body 191. A vent 192 is formed in the main body 191. The air chamber 194 communicates through the vent 192 with the atmosphere. The piston 81 is urged leftwards by a compression spring 193 and normally it contacts with the part of the partitioning wall portion 94 of the main body 191. Other constructions are the same as in the controllable check valve device 70 of FIG. 4.

Further, a check valve 195 is arranged between the outlet of the fluid pump 8 and the pressure fluid supply conduit 14a of the change-over valves side. The forward direction of the check valve 195 is from the outlet of the fluid pump 8 toward the pressure fluid conduit 14a.

The fluid pump 8 starts to operate with the skid control operation, as in the above embodiments. The discharging fluid pressure of the fluid pump 8 is transmitted to the pump pressure chamber 79 of the check valve device 190. When it overcomes the urging force of the spring 193, the piston 81 is moved rightwards, so that the check valve device 190 functions as a usual check valve. Although brake fluid flows from the outlet of the fluid pump 8 toward the pressure fluid supply conduit 14a, it cannot flow toward the master cylinder 1, so long as the controllable check valve device 190 functions as a usual check valve. Spring force of the spring 193 is considerably small. For example, the urging force of the spring 193 to the piston 81 amounts to about 5 kg/cm$^2$. Accordingly, the piston 81 is moved to the right position to make the check valve device 190 functioning as check valve in a short time after the fluid pump 8 starts.

During the skid control operation, no "kick-back" is imparted to the brake pedal 2. When the brake pedal 2 is released from treading, the brake fluid from the wheel cylinders 4a and 4b returns through the change-over valves 15a and 15b and the controllable valve device 190 to the master cylinder 1 so that the brake fluid pressure in the wheel cylinders 4a and 4b becomes substantially zero. The other operations are the same in the apparatus of FIG. 4.

While the preferred embodiments have been described, variations thereto will occur to those skilled in the art within the scope of the present inventive concepts which are delineated by the following claims.

For example, in the above embodiments, the brake fluid pressure to the wheel cylinders 4a an 4b is decreased, maintained at constant and increased in accordance with the skid condition of the wheels 3a and 3b. However, this invention may be applied to the skid control operation that the brake fluid pressure to the wheel cylinders 4a and 4b is alternately decreased and increased in accordance with the skid condition of the wheels 3a and 3b. In that case, the inlet valve 5 may be omitted in the apparatus of FIG. 1 and FIG. 2, or two-position change-over valves may be used instead of the three-position change-over valves 15a and 15b in the apparatus of FIG. 4 and FIG. 5.

Further, in the above embodiment, the skid control system is applied to the rear wheels 3a and 3b. However, the apparatus of FIG. 1 to FIG. 5 may be applied also to the front wheels of the vehicle. Or the apparatus of FIG. 1 or FIG. 2 may be applied to each of the wheels of the vehicle.

Further, the above embodiments are applied to the four-wheeled vehicle. However, this invention may be applied to a two-wheeled vehicle or a motor-cycle.

Further, in the embodiments of FIG. 4 or FIG. 5, a throttle valve may be used instead of the pressure adjusting valve 95 or the check valve 195.

What is claimed is:

1. A brake fluid pressure control apparatus in a skid control system for a vehicle having at least one wheel and a brake for the wheel comprising:
   (A) a fluid pressure control valve device arranged between a master cylinder and a wheel cylinder of a brake for the wheel, said fluid pressure control valve device receiving control signals of a control unit measuring the skid condition of the wheel to control the brake fluid pressure to said wheel cylinder;
   (B) a hydraulic reservoir which, when the brake fluid pressure to said wheel cylinder is decreased with control of said fluid pressure control valve device, reserves the brake fluid discharged through said fluid pressure control valve device from said wheel cylinder;
   (C) a pressure fluid supply conduit connecting said master cylinder with said fluid pressure control valve device;
   (D) a fluid pump for returning the brake fluid from said hydraulic reservoir into said pressure fluid supply conduit; and
   (E) a controllable check valve device arranged in said pressure fluid supply conduit, including a control portion responsive to a fluid pressure of the master cylinder or the outlet of the pump, said control portion permitting said controllable check valve device to make the free communication between said master cylinder and said fluid pressure control valve device when said fluid pressure to the control portion is lower than a predetermined pressure, and permitting said controllable check valve device to open when said fluid pressure to the control portion is higher than said predetermined pressure, and only when brake fluid flows from said master cylinder toward said fluid pressure control valve device, and the outlet of said fluid pump being connected to said pressure fluid supply conduit between said controllable check valve device and said fluid pressure control valve device.

2. A brake fluid pressure control apparatus in a skid control system according to claim 1, in which the outlet of said fluid pump is connected through check valve means to said pressure fluid supply conduit between said controllable check valve device and said fluid pressure control valve device.

3. A brake fluid pressure control apparatus in a skid control system according to claim 1, in which said fluid pressure control valve device comprises an electromagnetic inlet valve and an electromagnetic outlet valve.

4. A brake fluid pressure control apparatus in a skid control system according to claim 1, in which said fluid pressure control valve device comprises an electromagnetic three-position change-over valve.

5. A brake fluid pressure control apparatus in a skid control system for a vehicle having at least one wheel and a brake for the wheel comprising:
   (A) a fluid pressure control valve device arranged between a master cylinder and a wheel cylinder of a brake for the wheel, said fluid pressure control valve device receiving control signals of a control unit measuring the skid condition of the wheel to control the brake fluid pressure to said wheel cylinder;
   (B) a hydraulic reservoir which, when the brake fluid pressure to said wheel cylinder is decreased with control of said fluid pressure control valve device, reserves the brake fluid discharged through said fluid pressure control valve device from said wheel cylinder;

(C) a pressure fluid supply conduit connecting said master cylinder with said fluid pressure control valve device;

(D) a fluid pump for returning the brake fluid from said hydraulic reservoir into said pressure fluid supply conduit; and (E) a controllable check valve device arranged in said pressure fluid supply conduit, including a control portion responsive to a fluid pressure of the master cylinder or the outlet of the pump, said control portion permitting said controllable check valve device to make the free communication between said master cylinder and said fluid pressure control valve device when said fluid pressure to the control portion is lower than a predetermined pressure, and permitting said controllable check valve device to open when said fluid pressure to the control portion is higher than said predetermined pressure, and only when brake fluid flows from said master cylinder toward said fluid pressure control valve device, the control portion includes a piston and a spring for urging said piston to a first position, said piston receiving the fluid pressure of the master cylinder, and when said fluid pressure of the master cylinder is lower than said predetermined pressure, said piston is located at said first position by said spring to permit said controllable check valve device to make the free communication between said master cylinder and said fluid pressure control valve device, and when said fluid pressure of the master cylinder is higher than said predetermined pressure, said piston is moved to a second position agianst said spring by said fluid pressure of the master cylinder to permit said controllable check valve device to open only when brake fluid flows from said master cylinder toward said fluid pressure control valve device and the outlet of said fluid pump being connected to said pressure fluid supply conduit between said controllable check valve device and said fluid pressure control valve device.

6. A brake fluid pressure control apparatus in a skid control system according to claim 5, in which said controllable check valve device further includes a main body and a check valve constituted by a valve body, a valve spring and a valve seat contained in said main body, said valve seat being formed on a part of the inner wall of said main body, and when said piston is located at said first position, said valve body is separated from said valve seat against said valve spring by said piston, and when said piston is located at said second position, said valve body is seated on said valve seat by said valve spring.

7. A brake fluid pressure control aparatus in a skid control system according to claim 6, in which said valve body is a ball.

8. A brake fluid pressure control apparatus in a skid control system according to claim 5, in which said controllable check valve device further includes a main body and a check valve constituted by a valve body, a valve spring and a valve seat contained in said main body, said valve seat being formed on a top end of said piston having a through hole communicating with said master cylinder, and when said piston is located at said first position, said valve body is made to contact with a stepped inner wall portion of said main body by said valve spring, said stepped inner wall portion having a cut-out groove, and when said piston is located at said second position, said valve body is seated on said valve seat against said valve spring and said spring by the fluid pressure of the master cylinder applied to said piston.

9. A brake fluid pressure control apparatus in a skid control system according to claim 8, in which said valve body is a ball.

10. A brake fluid pressure control apparatus in a skid control system for a vehicle having at least one wheel and a brake for the wheel comprising:

(A) a fluid pressure control valve device arranged between a master cylinder and a wheel cylinder of a brake for the wheel, said fluid pressure control valve device receiving control signals of a control unit measuring the skid condition of the wheel to control the brake fluid pressure to said wheel cylinder;

(B) a hydraulic reservoir which, when the brake fluid pressure to said wheel cylinder is decreased with control of said fluid pressure control valve device, reserves the brake fluid discharged through said fluid pressure control valve device from said wheel cylinder;

(C) a pressure fluid supply conduit connecting said master cylinder with said fluid pressure control valve device;

(D) a fluid pump for returning the brake fluid from said hydraulic reservoir into said pressure fluid supply conduit; and (E) a controllable check valve device arranged in said pressure fluid supply conduit, including a control portion responsive to a fluid pressure of the master cylinder or the outlet of the pump, said control portion permitting said controllable check valve device to make the free communication between said master cylinder and said fluid pressure control valve device when said fluid pressure to the control portion is lower than a predetermined pressure, and permitting said controllable check valve device to open when said fluid pressure to the control portion is higher than said predetermined pressure, and only when brake fluid flows from said master cylinder toward said fluid pressure control valve device, the control portion includes a piston and a spring for urging said piston to a first position, said piston receiving the fluid pressure to the outlet of the fluid pump, and when said fluid pressure of the outlet of the fluid pump is lower than said predetermined pressure, said piston is located at said first position by said spring to permit said controllable check valve device to make the free communication between said master cylinder and said fluid pressure control valve device, and when said fluid pressure of the outlet of the fluid pump is higher than said predetermined pressure, said piston is moved to a second position against said spring by said fluid pressure of the outlet of the fluid pump to permit said controllable check valve device to open only when brake fluid flows from said master cylinder toward said fluid pressure control valve device, and the outlet of said fluid pump being connected to said pressure fluid supply conduit between said controllable check valve device and said fluid pressure control valve device.

11. A brake fluid pressure control apparatus in a skid control system according to claim 10, in which said controllable check valve device further includes a main body and a check valve constituted by a valve body, a valve spring and a valve seat contained in said main body, said valve seat being formed on a part of the inner wall of said main body, and when said piston is located at said first position, said valve body is separated from said valve seat against said valve spring by said piston, and when said piston is located at said second position, said valve body is seated on said valve seat by said valve spring.

12. A brake fluid pressure control apparatus in a skid control system according to claim 10, in which the outlet of said fluid pump is connected through a check valve to said pressure fluid supply conduit between said controllable check valve device and said fluid pressure control valve device.

13. A brake fluid pressure control apparatus in a skid control system for a vehicle having at least one wheel and a brake for the wheel comprising:

(A) a fluid pressure control valve device arranged between a master cylinder and a wheel cylinder of a brake for the wheel, said fluid pressure control valve device receiving control signals of a control unit measuring the skid condition of the wheel to control the brake fluid pressure to said wheel cylinder;

(B) a hydraulic reservoir which, when the brake fluid pressure to said wheel cylinder is decreased with control of said fluid pressure control valve device, reserves the brake fluid discharged through said fluid pressure control valve device from said wheel cylinder;

(C) a pressure fluid supply conduit connecting said master cylinder with said fluid pressure control valve device;

(D) a fluid pump for returning the brake fluid from said hydraulic reservoir into said pressure fluid supply conduit; and (E) a controllable check valve device arranged in said pressure fluid supply conduit, including a control portion responsive to a fluid pressure of the master cylinder or the outlet of the pump, said control portion permitting said controllable check valve device to make the free communication between said master cylinder and said fluid pressure control valve device when said fluid pressure to the control portion is lower than a predetermined pressure, and permitting said controllable check valve device to open when said fluid pressure to the control portion is higher than said predetermined pressure, and only when brake fluid flows from said master cylinder toward said fluid pressure control valve device, the control portion includes a piston and a spring for urging said piston to a first position, said piston receiving the fluid pressure of the master cylinder at one side and the fluid pressure of the outlet of said fluid pump at another side and when said fluid pressure of the outlet of the fluid pump is lower than said predetermined pressure, said piston is located at said first position by said spring and said fluid pressure of the master cylinder to permit said controllable check valve device to make the free communication between said master cylinder and said fluid pressure control valve device, and when said fluid pressure of the outlet of the fluid pump is higher than said predetermined pressure, said piston is moved to a second position against said spring and said fluid pressure of the master cylinder by said fluid pressure of the outlet of the fluid pump to permit said controllable check valve device to open only when brake fluid flows from said master cylinder toward said fluid pressure control valve device, and the outlet of said fluid pump being connected to said pressure fluid supply conduit between said controllable check valve device and said fluid pressure control valve device.

14. A brake fluid pressure control apparatus in a skid control system according to claim 13, in which said controllable check valve device further includes a main body and a check valve constituted by a valve body, a valve spring and a valve seat contained in said main body, said valve seat being formed on a part of the inner wall of said main body, and when said piston is located at said first position, said valve body is separated from said valve seat against said valve spring by said piston, and when said piston is located at said second position, said valve body is seated on said valve seat by said valve spring.

15. A brake fluid pressure control apparatus in a skid control system according to claim 14, in which said valve body is a ball.

16. A brake fluid pressure control apparatus in a skid control system according to claim 13, in which the outlet of said fluid pump is connected through a pressure adjusting valve to said pressure fluid supply conduit between said controllable check valve device and said fluid pressure control valve device, and said pressure adjusting valve is opened when the fluid pressure of the outlet of said fluid pump is higher than a second predetermined pressure which is higher than said first-mentioned predetermined pressure, said brake fluid being able to flow only from the outlet of said fluid pump toward said pressure fluid supply conduit.

* * * * *